UNITED STATES PATENT OFFICE 2,330,179

HYDROXYHALOCARBONYL COMPOUND AND PROCESS FOR PRODUCING SAME

Glen H. Morey, Terre Haute, Ind., assignor to Commercial Solvents Corporation, Terre Haute, Ind., a corporation of Maryland No Drawing. Application May 16, 1940,
Serial No. 335,556

6 Claims. (Cl. 260—594)

My invention relates to condensation products of an aldehyde and a carbonyl compound, at least one of which contains at least one halogen atom. More specifically, my invention relates to hydroxyhalocarbonyl compounds which are useful for the synthesis of other organic compounds since they contain three different reactive groups. My invention also relates to a process for producing products of this type.

The new compounds included in the condensation products referred to above may be designated by the general formula:

wherein $R^1$ and $R^2$ are chosen from the class consisting of hydrocarbon radicals, hydroxyhydrocarbon radicals, heterocyclic radicals, halohydrocarbon radicals, and hydroxyhalohydrocarbon radicals, at least one halogen atom and at least one hydroxy group being included in the substituents $R^1$ and $R^2$.

My new compounds may suitably be prepared by reacting an aldehyde with a haloaldehyde or a haloketone, or by reacting a haloaldehyde with an aldehyde, ketone, haloaldehyde, or haloketone. More specifically, my new compounds may be prepared by reacting an aldehyde of the general formula:

with a carbonyl compound of the general formula:

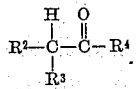

wherein $R^1$ is chosen from the class consisting of hydrogen, hydrocarbon radicals, halohydrocarbon radicals, and heterocyclic radicals; $R^2$ and $R^3$ are chosen from the class consisting of hydrogen, halogen, hydrocarbon radicals, and halohydrocarbon radicals; $R^4$ is chosen from the class consisting of hydrogen, hydrocarbon radicals and halohydrocarbon radicals; at least one halogen atom is included in the substituents $R^1$, $R^2$, $R^3$, and $R^4$; and less than three halogen atoms are included in the constituents $R^2$, $R^3$, and $R^4$.

Among the reactants of the above classes, I prefer to employ saturated aliphatic aldehydes, especially formaldehyde, or alpha-chlorinated saturated aliphatic aldehydes, and saturated aliphatic ketones, especially acetone, or alpha-chlorinated saturated aliphatic ketones. It is to be understood, however, that although I prefer to employ reactants of this latter group, all of the compounds included in the general formulas given above may be reacted in accordance with the present invention.

In carrying out the reaction of the present invention, the two reactants are mixed and a basic condensation catalyst is added to the mixture to effect the condensation reaction. The two reactants may be mixed without the aid of a solvent, but a mutual solvent may be employed if desired. Likewise, one of the reactants may be employed in the form of a solution in a solvent which may be a mutual solvent for both the reactants, or which may be a solvent for the reaction product. For example, formaldehyde may be utilized in the form of the usual 37%–40% aqueous solution. This solution may be immiscible with the halocarbonyl compound with which it is to be reacted but after reaction has ensued, a single liquid phase may result owing to the solubility of the hydroxyhalocarbonyl compound in water.

The rate of reaction may be controlled by the temperature and by the rate of addition of the alkaline catalyst to the reaction mixture. The reaction will take place at temperatures ranging from below 0° C. up to the reflux temperature of the mixture. In general, however, I prefer to effect the reaction at temperatures from 0° C. to approximately 50° C., and room temperature is usually quite satisfactory. The alkaline catalyst may all be added initially to the reaction mixture, but this procedure is most desirable only when a relatively insoluble alkaline material is employed. In the case of soluble alkalies, I prefer to add the material in the form of a solution, either continuously or intermittently over a period of time, for example, from 0.25 to 5.0 hours. Usually a reaction time of one-half hour to one hour will be satisfactory, in which case the alkaline catalyst may be added to the reaction mixture within this period of time. It is usually desirable, however, to allow the reaction mixture to stand for some time, e. g., a few hours, after the introduction of all of the condensation catalyst.

The proportions of the reactants may be varied within relatively wide limits, e. g., from 0.5 mole to 5.0 moles, or more of aldehyde per mole of the other carbonyl compound. The condensation reaction can take place between different numbers of molecules of the reactants, depending upon the number of reactive hydrogen atoms in alpha position to the carbonyl groups. Thus, theoretically, 5 moles of formaldehyde could condense with 1 mole of chloroacetone, whereas only 4 moles could condense with 1 mole of dichloroacetone. I have found, however, that the most reactive hydrogen atoms are those attached to an alpha carbon atom to which chlorine is also attached. This enables the predominant reaction product to be determined by the molecular proportion of the reactants. Thus, one mole of formaldehyde and one mole of unsymmetrical dichloroacetone will produce predominantly 3-3-dichloro-4-hydroxy-2-butanone, whereas two moles of formaldehyde and one mole of chloroacetone will produce predominantly 2-acetyl-2-chloro-1,3-propanediol.

Any of the known basic condensation catalysts may be employed to effect the condensations of the present invention. The common alkaline condensation catalysts, such as sodium hydroxide, potassium hydroxide, calcium hydroxide, trisodium phosphate, and the like, are very satisfactory for this purpose. Materials such as calcium hydroxide may be added in the dry form or as a suspension in water or other inert solvent. Materials such as sodium hydroxide or potassium hydroxide may suitably be added as an aqueous or alcoholic solution. The amount of catalyst to be employed is not critical and may be varied to a considerable extent. In general, from 1 to 15 mole percent, based on the aldehyde reactant, will be found to be satisfactory, and in most cases I prefer to employ from 5 to 10 mole percent. In certain instances, and especially if formaldehyde is one of the reactants, some of the alkaline catalyst appears to be used up in some side reaction and in these cases it is preferred to employ at least 5 mole percent of the catalyst in order to insure adequate catalytic action.

My invention may be further illustrated by the following specific examples:

*Example I*

Chloroacetone and formaldehyde (40% aqueous solution) were mixed in a ratio of approximately 2.1 moles of formaldehyde per mole of chloroacetone. The mixture was agitated at room temperature for approximately one-half hour, during which time approximately 0.13 mole of sodium hydroxide per mole of formaldehyde was added in the form of a 2 N aqueous solution. The temperature of the reaction mixture increased during the addition of the catalyst, due to the best of reaction. After the catalyst was added, the mixture was agitated for three hours to ensure complete reaction.

The resulting reaction mixture was then distilled, removing water at 100° C. and atmospheric pressure, and volatile products at 140° C. and 5-10 mm. pressure. A nonvolatile tarry residue remained in the distillation vessel, and the distillate was found to comprise a water-white syrupy liquid and a crystalline solid. These products were obtained in the following yields, based on the weight of the initial reactants:

| | Percent |
|---|---|
| Crystalline product | 33 |
| Syrupy product | 21 |
| Tarry residue | 8.7 |

The crystalline product was identified as the following compound, after recrystallizing from heptane:

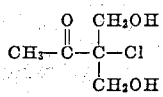

This compound was found to have the following properties:

Melting point °C__ 61
Percent chlorine_____ 23.36 (theoretical 23.36)
Molecular weight_____ 149 (theoretical 152.5)

Two components of the syrupy fraction of the distillate were found to have the following properties:

| | (1) | (2) |
|---|---|---|
| Boiling point (760 mm.) ___° C__ | 182 | 210 |
| Boiling point (10 mm.) ____° C__ | 73 | 93.5 |
| Percent chlorine _____ | 42.49 | 21.45 |
| Molecular weight _____ | 128.4 | 169.8 |
| Specific gravity (20/20° C.) _____ | 1.371 | 1.286 |

Product 1 was not identified structurally, but product 2 was found to have the structural formula:

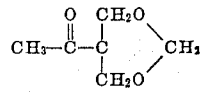

This cyclic acetal was also prepared by reacting the crystalline compound:

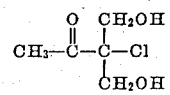

with formaldehyde. The product was identified with the cyclic acetal isolated as described above, by the formation of identical 2,4-dinitrophenylhydrazones from the two compounds. Other cyclic acetals of this type may be prepared by reacting a 2-halo-2-acyl-1,3-propanediol with any other aldehydes, or ketones, as, for example, acetaldehyde, butyraldehyde, furfural, benzaldehyde, acetone, methyl ethyl ketone, cyclohexanone, or acetophenone. In this manner there may be formed 5-chloro-5-acyl-1,3-dioxanes of the general formula:

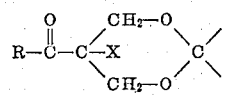

wherein X represents a halogen atom, R is chosen from the class consisting of hydrocarbon radicals, and halohydrocarbon radicals, and the free valences are satisfied by elements of the class consisting of hydrogen atoms, and carbon atoms of the residue of the carbonyl compound of the class consisting of aldehydes and ketones, in which

represents the carbonyl carbon atom.

*Example II*

The process of Example I was followed, utilizing approximately 5 moles of formaldehyde per mole of chloroacetone. The product was a water-white syrupy liquid.

*Example III*

The procedure of Example I was followed, employing as reactants approximately equimolecular proportions of chloroacetone and formaldehyde. The reaction product was a straw-colored oil which distilled at 130° C. (2 mm.) and contained 15.5% chlorine.

*Example IV*

The process of Example I was followed, substituting aqueous acetaldehyde for the aqueous formaldehyde in the reaction mixture. The product was a water-white syrupy liquid.

Example V

The process of Example II was followed, utilizing symmetrical dichloroacetone instead of chloroacetone. The product was a viscous honey-colored syrup.

Example VI

The procedure of Example I was followed, employing the following components and proportions in the reaction mixture:

|  | Mole |
|---|---|
| Methyl alpha-chloroethyl ketone | 1.0 |
| Formaldehyde | 0.9 |
| Sodium hydroxide (2 N aq. sol.) | 0.11 |

The reaction product was recovered by vacuum distillation, after first distilling off the water from the reaction mixture. The product was a water-white oily liquid which is believed to have the following structural formula:

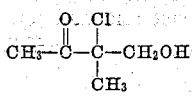

The conversion of the chloroketone to this product was approximately 20%. The new compound was found to have the following properties:

| Boiling point | 109° C. (50 mm.) |
|---|---|
| Per cent chlorine | 25.67 (theoretical 26.00) |
| Specific gravity | 1.133 (20/20° C.) |

Example VII

The procedure of Example I was followed, employing the following components and proportions in the reaction mixture:

|  | Mole |
|---|---|
| Unsymmetrical dichloroacetone | 1.0 |
| Formaldehyde (40% aq. sol.) | 1.1 |
| Sodium hydroxide (2 N aq. sol.) | 0.09 |

The reaction product was recovered by vacuum distillation in an amount approximating 70% conversion of the dichloroacetone. The new product was found to be a water-white oily liquid which is believed to have the following structural formula:

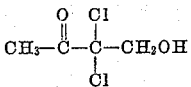

This compound was found to have the following properties:

| Boiling point | 105° C. (50 mm.) |
|---|---|
| Per cent chlorine | 44.96 (theoretical 45.21) |
| Specific gravity | 1.34 (20/20° C.) |

Example VIII

A reaction mixture of the following approximate composition was heated at 100° C. for approximately 1 hour:

|  | Mole |
|---|---|
| Unsymmetrical dichloroacetone | 1.0 |
| Chloral (anhydrous) | 1.0 |
| Calcium hydroxide (dry) | 0.05 |

A crystalline product was obtained which is believed to have the following formula:

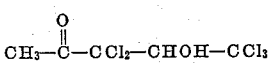

After recrystallization from benzene, this product was found to have the following properties:

| Melting point° C |  |
|---|---|
| Per cent chlorine | 64.12 (theoretical 64.70) |
| Molecular weight | 263.6 (theoretical 274.5) |

Example IX

The procedure of Example VIII was followed, employing approximately equimolecular proportions of chloral and acetone as reactants. A crystalline product was obtained, which, after recrystallization from a mixture of benzene and petroleum ether was found to have the following properties:

| Melting point | ° C | 71–73 |
|---|---|---|
| Per cent chlorine |  | 51.63 |
| Molecular weight |  | 206.6 |

This compound is believed to have the structural formula:

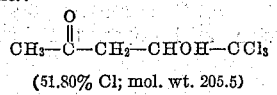

(51.80% Cl; mol. wt. 205.5)

Example X

The procedure of Example I was followed, utilizing a reaction mixture of the following components and proportions:

|  | Moles |
|---|---|
| Chloroacetophenone | 1.0 |
| Formaldehyde (40% aq. sol.) | 2.4 |
| Anhydrous methanol (solvent) | 2.0 |
| Sodium hydroxide (2 N aq. sol.) | 0.08 |

After distilling water and methanol from the mixture at the conclusion of the reaction, the product was recovered in the form of a thick syrup.

Example XI

The procedure of Example I was followed employing as reactants approximately equimolecular proportions of chloroacetone and anhydrous furfural. The reaction product was a very viscous, dark colored, resin-like material.

It is to be understood, of course, that the above examples are illustrative only, and do not limit the scope of my invention. Other reactants of the classes previously defined could be substituted for those specifically employed in the examples, and the reaction conditions could be modified in numerous respects without materially affecting the results. In general, it may be said that the use of any equivalents or modifications of procedure which would naturally occur to one skilled in the art is included in the scope of my invention.

My invention now having been described, what I claim is:

1. A process for the production of hydroxychlorocarbonyl compounds which comprises reacting, in the presence of an alkaline condensation catalyst, an aliphatic aldehyde and an alpha-chlorinated ketone, to produce an alpha-chloro-beta-hydroxy ketone.

2. A process for the production of hydroxychlorocarbonyl compounds which comprises reacting, in the presence of an alkaline condensation catalyst, formaldehyde and chloroacetone, to produce 2-acetyl-2-chloro-1,3-propanediol.

3. A hydroxychlorocarbonyl compound of the formula:

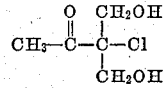

4. A hydroxychlorocarbonyl compound of the formula:

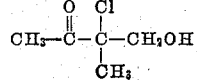

5. A process for the production of hydroxy-halocarbonyl compounds of the formula:

$$R^1-\underset{\underset{\displaystyle}{\|}}{\overset{O}{C}}-R^2$$

wherein $R^1$ is a member of the class consisting of hydrocarbon radicals, alpha-halo-hydrocarbon radicals, and alpha-halo-beta-hydroxy hydrocarbon radicals, $R^2$ is a member selected from the group consisting of alpha-halo-hydrocarbon radicals, and alpha-halo-beta-hydroxy hydrocarbon radicals, said compound containing at least one hydroxy group and at least one halogen atom, which comprises reacting, in the presence of a basic condensation catalyst, an aldehyde with a halogenated ketone of the formula:

$$R^1-\underset{\underset{\displaystyle R^3}{|}}{\overset{\overset{\displaystyle H}{|}}{C}}-\overset{\overset{\displaystyle O}{\|}}{C}-R^4$$

wherein $R^2$ and $R^3$ are chosen from the class consisting of hydrogen, halogen, and hydrocarbon radicals, and $R^4$ is chosen from the class consisting of hydrocarbon radicals and alpha-halo-alkyl radicals, the number of halogen atoms included among the substituents $R^2$, $R^3$, and $R^4$ being at least one, and less than three, to produce hydroxyhalocarbonyl compounds of the type described.

6. A hydroxyhalocarbonyl compound of the general formula:

$$R^1-\underset{\underset{\displaystyle}{\|}}{\overset{O}{C}}-R^2$$

wherein $R^1$ is a member of the class consisting of hydrocarbon radicals, alpha-halo-hydrocarbon radicals, and alpha-halo-beta-hydroxy hydrocarbon radicals and $R^2$ is a member selected from the group consisting of alpha-halo-alkyl, and alpha-halo-beta-hydroxyalkyl, said compound containing at least one hydroxy group, and at least one halogen atom.

GLEN H. MOREY.